United States Patent [19]

Downey

[11] 4,362,128
[45] Dec. 7, 1982

[54] LIVESTOCK FLOORING

[75] Inventor: Bernard L. Downey, Oak Brook, Ill.

[73] Assignee: B. L. Downey Company, Inc., Cicero, Ill.

[21] Appl. No.: 277,896

[22] Filed: Jun. 26, 1981

[51] Int. Cl.³ .............................................. A01K 1/01
[52] U.S. Cl. ..................................................... 119/28
[58] Field of Search ........................ 119/28, 16; 52/664

[56] References Cited

U.S. PATENT DOCUMENTS 1,071,822  9/1913  Storey .................................. 52/664
3,119,373  1/1964  Schmid ................................. 119/28

FOREIGN PATENT DOCUMENTS 2742605  3/1979  Fed. Rep. of Germany ........ 119/28
2755842  6/1979  Fed. Rep. of Germany ........ 119/28

Primary Examiner—Hugh R. Chamblee
Attorney, Agent, or Firm—Hume, Clement, Brinks, Willian & Olds, Ltd.

[57] ABSTRACT

A coated animal flooring which is raised off a barn or crate floor but requires no independent framing. A deck is formed of filler wires extending in one direction and base wires extending perpendicular thereto. The wires are either welded or crimped together. Welded to the underside of the deck, extending parallel to each other, are a plurality of support bars. Welded to the base of each of the support bars, extending perpendicular thereto, are a plurality of tie rods. The flooring is coated, preferably with plastic.

7 Claims, 12 Drawing Figures

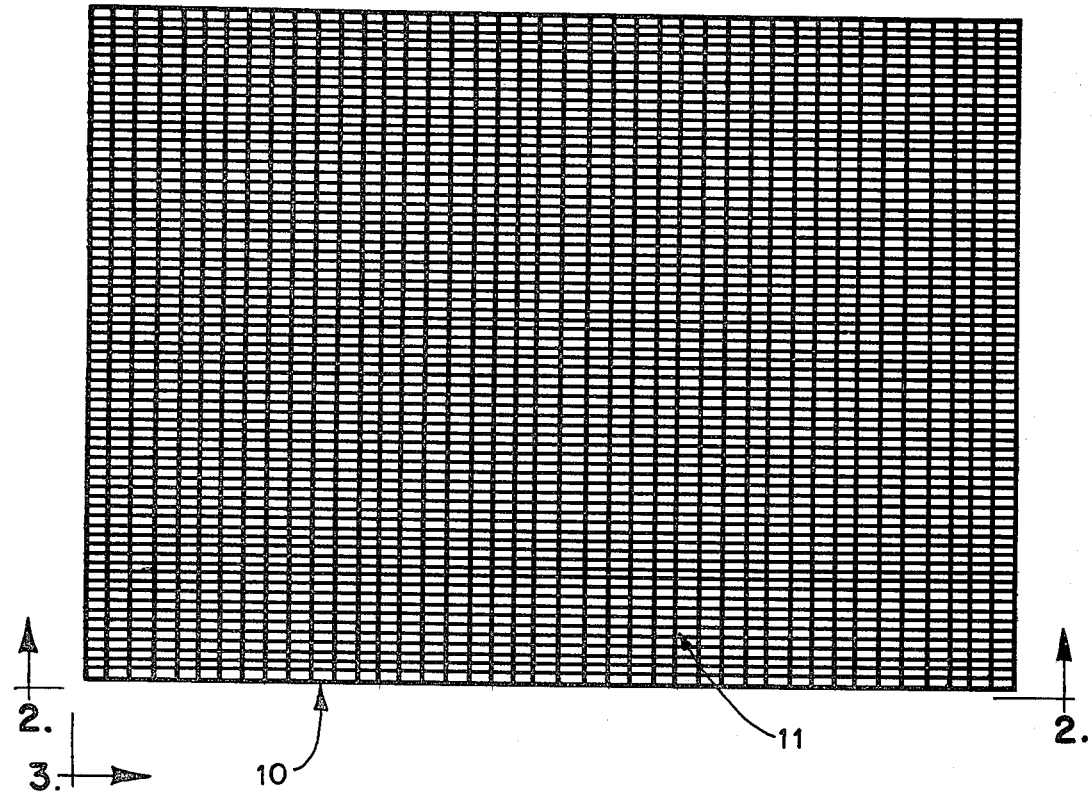
FIG. 1
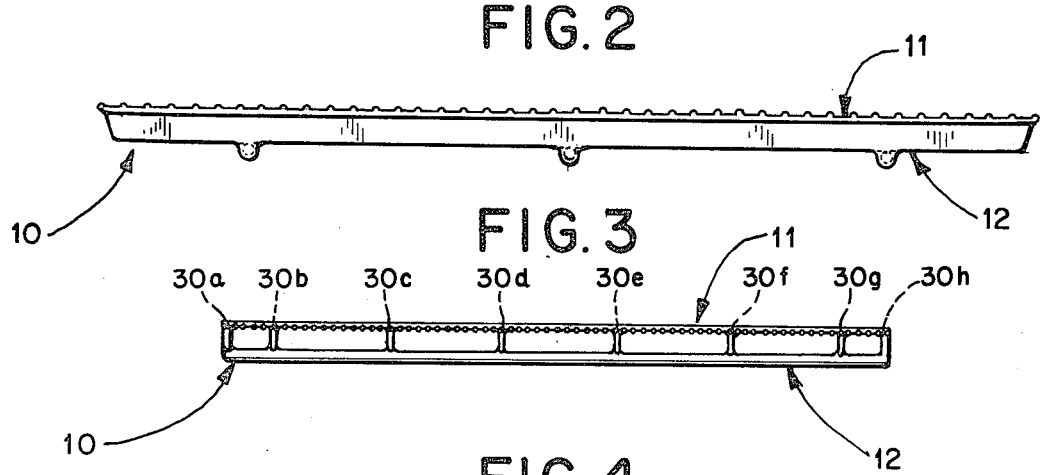
FIG. 2
FIG. 3
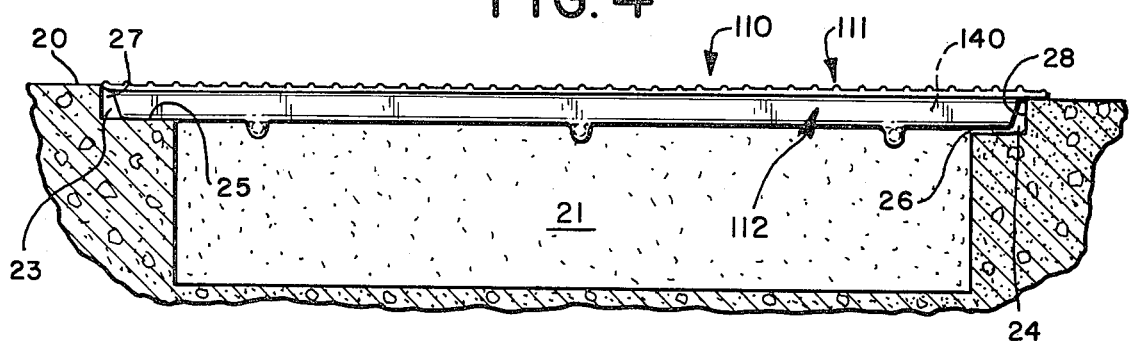
FIG. 4

FIG. 8
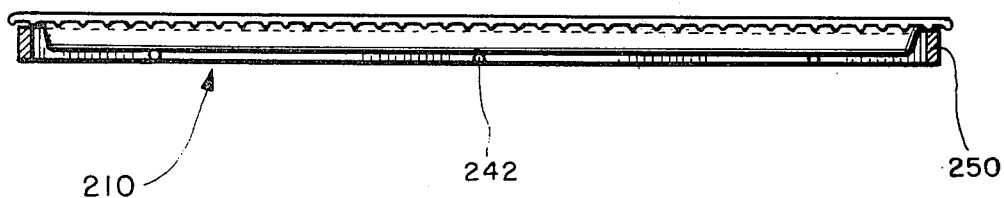
FIG. 9
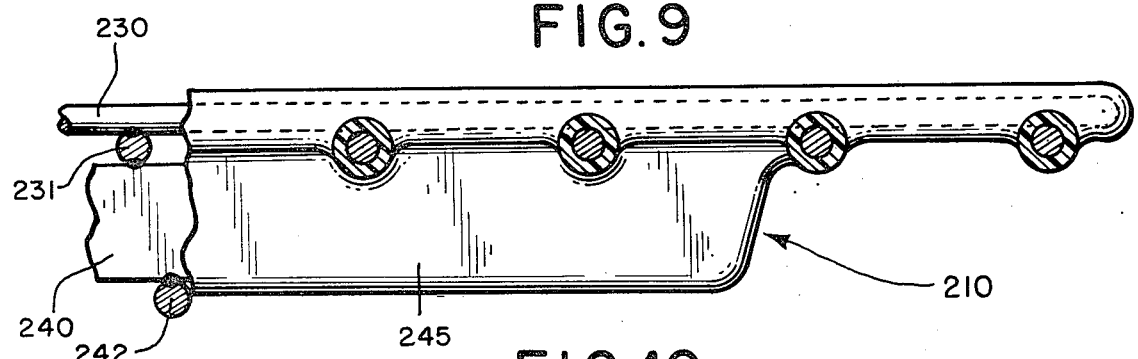
FIG. 10
FIG. 11
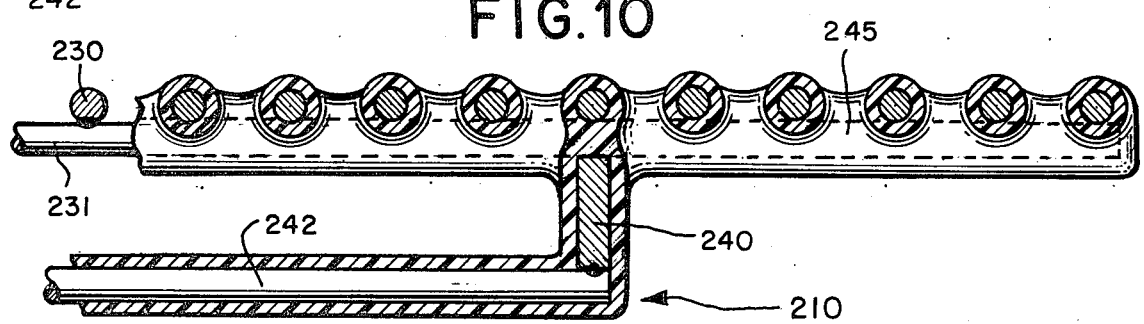
FIG. 12
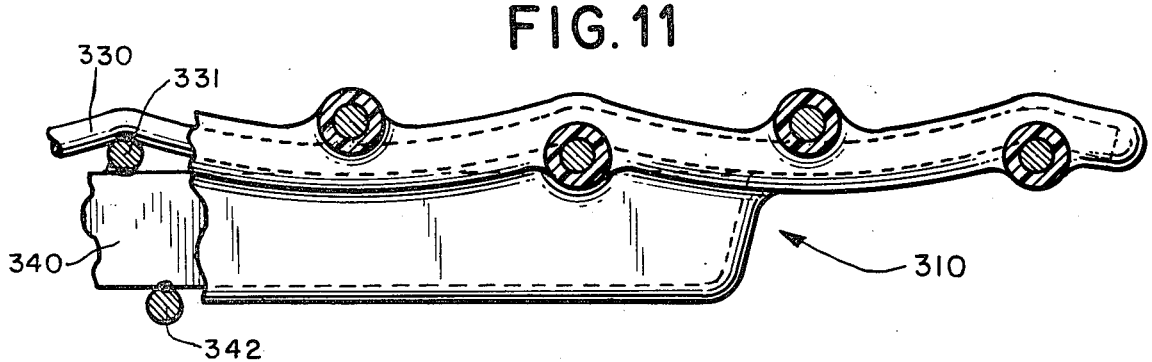

LIVESTOCK FLOORING

FIELD OF THE INVENTION

This invention is in the field of confinement animal flooring. It relates particularly to confinement flooring of the type which is coated.

BACKGROUND OF THE INVENTION

Plastic-coated animal flooring, in its conventional form, has been used in animal confinement production for several years. For example, expanded metal screens coated with a polyvinyl chloride (PVC) plastic layer by dipping or other techniques are used in various stages of pig production as flooring in crate or pen areas. Plastic-coated, welded and woven wire screens are used in the same manner.

Plastic-coated screens provide softer, more hygenic and comfortable flooring for the animals than traditional concrete barn flooring. In addition, they serve to raise the animals off the floor and, in effect, insulate them from it, i.e., they provide a warmer bed than the barn floor. Furthermore, manure falls between the courses of the screen onto the floor so that a more healthy environment is provided.

The prior art screens are laid on the pen floor, as previously mentioned, or supported above the floor on frames with support. The latter approach is more expensive, of course, but it does further insulate the animals from the floor and permits easier removal of manure.

SUMMARY OF THE INVENTION

An object of the invention is to provide new and improved coated animal flooring. Another object is to provide new and improved coated animal flooring which is raised off the barn or crate floor but requires no independent framing. A further object is to provide a simple and inexpensive, self-supporting, coated animal flooring construction. Still a further object is to provide modular, coated animal flooring of the aforedescribed character. A final object is to provide flooring of the aforedescribed character which greatly improves in-house ventilation by eliminating bulky underframings which inhibit air movement.

The foregoing and other objects are realized in accord with the invention by providing a flooring panel having one of two forms of deck. Either welded or woven and crimped wire elements are arranged perpendicular to each other to form the flooring deck. Steel wire having a diameter which might vary between 5 to 10 mm is used. One set of wires extending parallel to each other and spaced relatively far apart is referred to as the base wire set. The other set of wires extending parallel to each other and perpendicular to the base wires has a much smaller spacing and is referred to as the filler wire set.

In an exemplary form of panel deck the sets of wires are layered and resistance welded together at each intersection. The filler wires are on the bottom. An exemplary deck would be 160 cm by 224 cm in dimension. The filler wires are the long wires and approximately eighty (80) of them are employed when constructing a five foot by seven foot section. The base wires are the shorter wires and approximately forty (40) of them are employed in a like section.

Welded to the bottom of each of six (6) filler wires in the deck, along substantially their entire length, is a steel support bar. Each bar can vary in weight (gauge) and height, for example, from 3 to 6 mm in thickness and 25 to 50 mm in height. Resistance welding is employed to achieve welds along the entire length of each bar and corresponding filler wire. The location of each supporting bar will vary depending on the load factor and the length and width of the area to be covered.

Another feature of this invention is embodied in welding or otherwise fastening a plurality of round or square steel tie rods to the bottom of the support bars. These rods extends transversely of the support bars. They unitize the support bar complex and increase the integrity of the flooring.

The tie rods vary in diameter (gauge) and location depending on the contemplated animal (and/or human) load factor. Their size and location are also affected by the span area the panel is required to handle.

The aforedescribed constructed permits reinforcement beneath the deck to be adjusted according to the load. Vertical reinforcement bars are welded in closer relationship for additional support. When the load and/or panel span distance is less reinforcement bar spacing is increased.

The invention permits heavy as well as light weight animals to live in a raised, off the ground area, or above a concrete floor, without their feet touching ground or concrete. Animal waste is permittted to pass thru the flooring without the feet of the animal falling thru the openings. This type of construction permits the healthy growing and maturing of animals above a base floor, or above ground, when confinement is necessary.

Self supported floor panels can be placed in such a manner as to permit continuous joining of panels to form a unitized surface raised off a floor or over a pit, allowing the animal to grow and live in confinement in comfort free of litter and bacteria. The unitized construction permits more animals to be confined per square foot of floor area. This is due to the elimination of animal contact with the wet waste and litter, as well as the elimination of a space-consuming framework. The difficulty of catching and herding of animals in an open housing area is minimized for the same reason. The animals thus are permitted to live on a clean, dry, comfortable surface.

The self supporting floor design permits the use of a steel deck which would otherwise not span an open area without a pillar or support rising from the base. By eliminating bulky underframings which inhibit air movement, ventilation is significantly improved. Circulation of both hot and cold air can be controlled more easily.

The wire and bar panel is first assembled by welding. Then it is cleaned by conventional mechanical or chemical means. Then, by spraying, dipping, fluid bed deposition or electro-deposition, the panel is completely coated with a plastic material to a predetermined thickness. Following are examples of various types of materials which might be used and the coating thickness recommended for each according to the invention:

| | |
|---|---|
| Plastisol (liquid PVC) | 3 mm ± 1.5 mm |
| Vinyl (powdered PVC) | 5 mm ± 1.25 mm |
| Polyethylene (powdered resin) | 5 mm ± 1.25 mm |
| Epoxy (powdered) | 1.25 mm ± .75 mm |
| Epoxy (fluid base) | 5 mm ± 1.25 mm |
| Nylon (powdered) | 5 mm ± 1.25 mm |
| Urethane (liquid) | 3 mm ± 1.5 mm |
| Urethane (powdered) | 5 mm ± 1.25 mm |

| -continued | |
|---|---|
| Synthetic Rubber | 3 mm ± 1.5 mm |

The plastic-coated panels (i.e., excepting synthetic rubber coated) are then oven baked in a conventional manner to cure the plastic.

A welded panel embodying the invention may also take other, i.e., modified forms. For example, the filler wires may be on top of the base wires in a welded wire panel. In such case a more tightly spaced series of surfaces is provided on top and overall a more uniform surface results. Conversely, traction for the animal, a pig, for example, is more limited. In this form the support bars are welded cross-wise to the lower base wires and welds are made only at corresponding intersections of bars and base wires.

Because wire, both round and square metal, can become slippery when plastic coated, a special texture plastic is utilized. The texture is created by using different size particles in the plastic formulation which, when properly mixed and cured, cause the final finish to have small hills and valleys. These permit animals as well as humans to walk or stand on the surface of the coated section without slipping.

Coating has, to this point, been discussed solely in terms of a plastic or plastic-like material. The invention also contemplates applying a galvanized coating by suitable galvanizing techniques. In all other respects the flooring is identical to that which is plastic coated.

BRIEF DESCRIPTION OF THE DRAWINGS

The invention, including its construction and method of operation, together with additional objects and advantages thereof, is illustrated more or less diagrammatically in the drawings, in which:

FIG. 1 is a top plan view of a livestock flooring panel embodying features of a first form of the present invention;

FIG. 2 is a side elevational view of the panel illustrated in FIG. 1, taken along line 2—2 of FIG. 1;

FIG. 3 is an end elevational view of the panel illustrated in FIG. 1, taken along line 3—3 of FIG. 1;

FIG. 4 is a view similar to FIG. 2 illustrating a panel which, at its left end, is similar to the panel of FIG. 1, the panel being in operational relationship on a barn floor, over a manure pit; a modification of the first form of panel being shown over the manure pit on the right;

FIG. 8 is a view similar to FIG. 4 illustrating a livestock flooring panel embodying features of a modification of the first form of the present invention;

FIG. 9 is an enlarged vertical sectional view through the panel of FIG. 8, with parts removed;

FIG. 10 is an enlarged vertical sectional view through the panel of FIG. 8, at right angles to FIG. 9, with parts removed;

FIG. 11 is a view similar to FIG. 9 illustrating a portion of a livestock panel embodying features of a second form of the present invention; and FIG. 12 is a view similar to FIG. 10 of the panel portion illustrated in FIG. 11.

DESCRIPTION OF THE PREFERRED EMBODIMENTS

Figure 5:
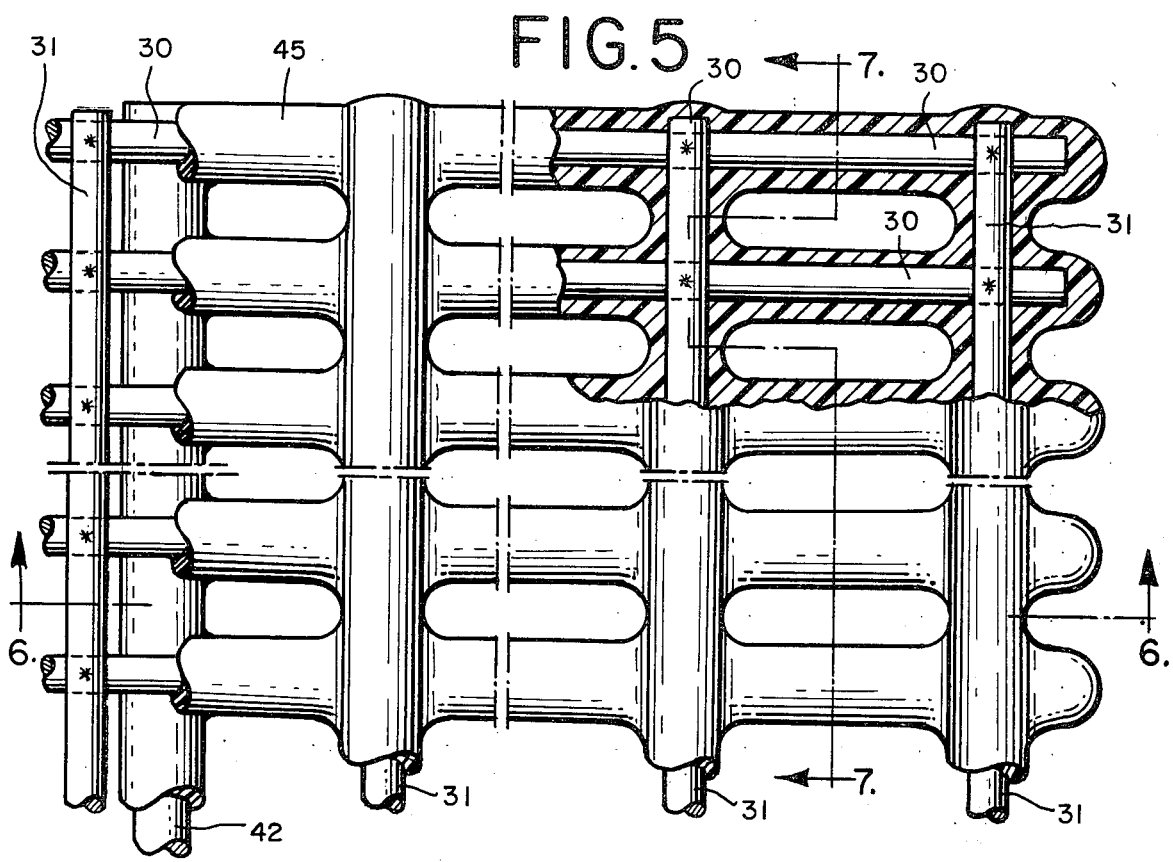
FIG. 5 is an enlarged plan view of a portion of the panel illustrated in FIG. 1.

Referring now to the drawings, and particularly to FIGS. 1-3, a livestock flooring panel embodying features of one form of the present invention is illustrated generally at 10. The panel 10 includes a lattice-like deck 11 which is supported by a support legs complex 12. As will hereinafter be discussed in detail, the exposed surface of the panel is a resilient plastic material. In the present illustration that plastic is a polyvinyl chloride (PVC) formulation commonly referred to as vinyl.

In the illustrated embodiment of the panel 10 its horizontal dimensions; i.e., width and length, are 160 cm by 244 cm. The height of the panel 10 (FIGS. 2 and 3) is 5 cm.

Figure 6:
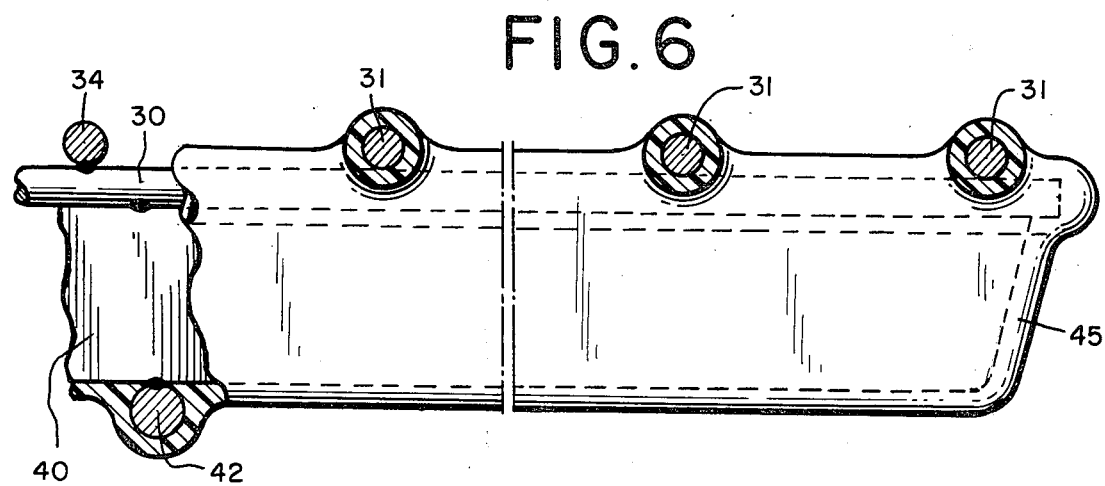
FIG. 6 is a sectional view taken along line 6—6 of FIG. 5.
Figure 7:
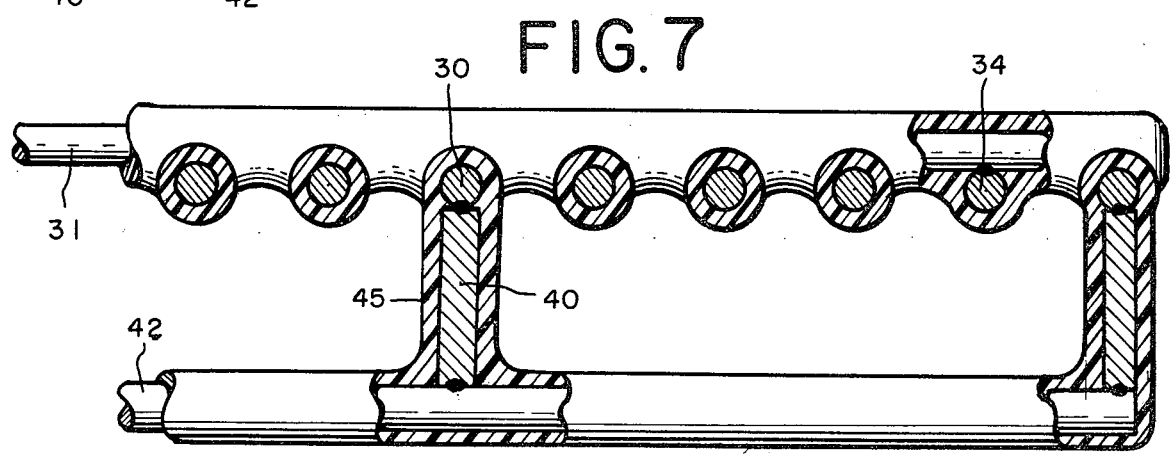
FIG. 7 is a sectional view taken along line 7—7 of FIG. 3.

Turning to FIGS. 5-7, an enlarged portion of the panel 10 is illustrated. The deck 11 of the panel 10 is seen to comprise a lower set of steel wires 30 which are referred to as filler wires. The filler wires 30 are 5 mm in diameter and extend parallel to each other on 2 cm center to center spacing. Accordingly, in a panel 10 which has a width of 160 mm, approximately eighty filler wires 30 are employed.

Overlying the filler wires 30, extending perpendicular thereto and parallel to each other, are an upper set of steel wires 31 which are referred to as base wires. The base wires 31 are spaced 5 cm apart on a center to center basis and are 5 mm in diameter. With a length dimension of 224 cm the panel 10 thus has approximately forty base wires 31.

The filler wires 30 and perpendicularly arranged base wires 31 are resistance welded together, as at 34, at each intersection by conventional resistance welding techniques. The result is a screen or lattice-work arrangement of wires rigidly connected at each intersection.

Welded to the underside of each of eight of the filler wires 30a–30h (see FIG. 3) is the support leg complex 12. It includes eight steel support bars 40. Each steel support bar 40 is 5 mm in thickness and 35 mm in height. Resistance welding is employed to produce welds 41 at intervals along the length of each bar and corresponding filler wire 30a–30h. Each bar 40 extends the entire length of the corresponding filler wire. (See FIG. 2).

Welded to the underside of the support bars 40 in the complex 12, extending perpendicular to the bars, are three stabilizer rods 42. The rods 42 are evenly spaced along the lengths of the support bars 40 and are welded to each bar to provide a transverse stabilizing effect to the bars and, accordingly, to the panel 10.

The welded wires 30,31, bars 40 and rods 42 have a coat 45 of Plastisol, a PVC compound. In the present illustration that coat 45 is 2.5 mm in thickness and is substantially uniform over the entire wire 30, 31 and bar 40 structure. The plastic is applied by dipping or other conventional techniques and is oven-baked. This cures the plastic to produce the tough yet resilient coat 45.

Turning now to FIG. 4, a panel 110 which is identical to the panel 10 except that, to illustrate an alternative operational mode, it is modified adjacent its right end, is illustrated. The panel 110 is shown in operational relationship on the floor of a farrowing crate (not shown) or the like for pigs. The floor 20 has a manure pit 21 formed in it. Along the left and right sides of the manure pit 21 recesses 23 and 24 are formed in the floor 20 to define a horizontal shoulders 25 and 26 and end walls 27 and 28.

The dimensions of the recess 23 are such that the panel 110 seats on the shoulder 25 with its left ends immediately adjacent the end wall 27. The depth of the recess 23 is such that the top of the deck 111 in the panel 110 at its left end is substantially level with the surface of the floor 20.

The dimensions of the recess 24 are such that the deck 111 rests on the surface of the floor 20. The support bars 140, which terminate short of the right end of the deck 111, are accommodated by the recess 24. Thus, an alternative mounting arrangement is provided.

In the present illustration a panel 10 comprises the entire floor of a crate (not shown). In this regard, farrowing crates are normally 160 cm by 244 cm in width and length. In practice one end of the pit 21 below floor level is left open to permit removal of manure without removing the panel 10.

FIGS. 8-10 illustrate a second form of panel 210 embodying features of the invention. The panel 210 differs from the panel 10 in that the filler wires 230 are welded on top of the base wires 231. Since the filler wires 230 are closer together than the base wires a more uniform surface results. However, as previously pointed out, traction for the animal is not as good.

FIGS. 9 and 10 illustrate the manner in which filler wires 230, base wires 231, support bars 240 and tie rods 242 are joined together by welding. As will be seen the bars 240 extend transversely of the bottom base wires 231 and thus are welded to the wires 231 only at the spots where they cross. In addition, as seen in FIG. 10, the outermost support bar 240 is eliminated. The entire wire and bar structure has a plastic coating 245.

FIG. 9 illustrates the manner in which the bars 240 terminate short of the edge of the deck 211. This construction is provided at the opposite edge of the deck, also, as seen in FIG. 8 (similar to the right side of the panel 110 in FIG. 4). As a result the deck 210 nests within a rectangular steel support frame 250 which extends around the entire periphery of the panel 10 and engages the bottom of the deck at the periphery.

FIGS. 11 and 12 illustrate a second form of the deck embodying features of the invention at 310. The panel 310 includes a deck 311 having perpendicularly arranged filler wires 330 and base wires 331 which are interwoven in a single plane, as illustrated. The wires 330 and 331 are crimped together rather than being welded.

Support bars 340 are welded, however, to the base wires 331, or rather to alternate base wires. The bars 340 extend perpendicular to the base wires 331. Stabilizing rods 342 are then welded to the bottoms of the bars 340 in the manner previously discussed. The entire steel wire, bar and rod arrangement is coated with plastic.

The length and positioning of the support bars 342 is illustrated as being identical to what is shown in FIGS. 9 and 10. As with that construction, however, the bar length and positioning might be similar to that found in the FIGS. 6 and 7 form of the invention in some applications.

Each form of panel discussed has been described as having a plastic coating. It should be understood, however, that a galvanized coating may be applied in lieu of the plastic. A somewhat less resilient surface is produced but other advantages of the construction are retained.

While several embodiments described herein are at present considered to be preferred, it is understood that various modifications and improvements may be made therein, and it is intended to cover in the appended claims all such modification and improvements as fall within the true spirit and scope of the invention.

I claim:

1. A livestock flooring panel, comprising:
   a. a horizontal deck;
   b. said deck including a plurality of steel base wires extending parallel to each other a first predetermined substantial uniform distance apart;
   c. said deck further including a plurality of steel filler wires extending parallel to each other a seconnd predetermined substantially uniform distance apart;
   d. said filler wires extending perpendicular to said base wires and engaging them at intersections;
   e. means fastening said filler wires and said base wires together at said intersections;
   f. a plurality of individual, elongated steel support bars depending from said deck between its edges and adapted to support said deck from a support surface;
   g. said support bars being separately welded to certain of said steel wires in at least one of said sets of steel wires; and
   h. a resilient plastic coating material substantially uniformly covering the base wires, filler wires and support bars after they are welded together.

2. The flooring panel of claim 1 further characterized by and including:
   a. a plurality of stabilizer rods welded to the bottom of said support bars and extending perpendicular thereto;
   b. said stabilizer rods also being covered with said resilient plastic coating material.

3. The flooring panel of claims 1 or 2 further characterized in that:
   a. said steel base wires are all in one plane; and
   b. said steel filler wires are all in another plane.

4. The flooring panel of claims 1 or 2 further characterized in that:
   a. said steel base wires are all in one plane;
   b. said steel filler wires are all in another plane; and
   c. said base wires are on top.

5. The flooring panel of claims 1 or 2 further characterized in that:
   a. said steel base wires are all in one plane;
   b. said steel filler wires are all in another plane; and
   c. said filler wires are on top.

6. The flooring panel of claims 1 or 2 further characterized in that:
   a. said support bars extend substantially to the edge of the panel at each of their ends.

7. The flooring panel of claims 1 or 2 further characterized in that:
   a. said support bars terminate substantially short of the edge of the panel at each of their ends.

* * * * *